(12) United States Patent
Inui et al.

(10) Patent No.: US 6,890,589 B2
(45) Date of Patent: May 10, 2005

(54) SELF-FORMABLE OPTICAL WAVEGUIDE MATERIAL COMPOSITION

(75) Inventors: Yukitoshi Inui, Aichi (JP); Kuniyoshi Kondo, Aichi (JP); Tatsuya Yamashita, Aichi (JP); Akari Kawasaki, Aichi (JP); Manabu Kagami, Aichi (JP); Hiroshi Ito, Aichi (JP); Shin Sato, Tokyo (JP); Eiichi Okazaki, Tokyo (JP)

(73) Assignee: Toyoda Gosei Co., Ltd., Aichi (JP)

( * ) Notice: Subject to any disclaimer, the term of this patent is extended or adjusted under 35 U.S.C. 154(b) by 35 days.

(21) Appl. No.: 10/314,961

(22) Filed: Dec. 10, 2002

(65) Prior Publication Data

US 2003/0125408 A1 Jul. 3, 2003

(30) Foreign Application Priority Data

Dec. 11, 2001 (JP) ..................................... P2001-377957

(51) Int. Cl.$^7$ .............................. C08J 3/28; G02B 6/10; G02B 6/16
(52) U.S. Cl. .......................... 427/163.2; 522/4; 522/90; 522/104; 522/168; 522/170; 522/17; 522/18; 427/517; 427/519; 385/123; 385/143; 385/145; 385/124
(58) Field of Search .............................. 427/163.2, 517, 427/519; 522/4, 90, 104, 168, 170, 17, 18, 182, 96; 385/123, 143, 145, 124

(56) References Cited

U.S. PATENT DOCUMENTS

| | | | | |
|---|---|---|---|---|
| 4,749,245 | A | * 6/1988 | Kawatsuki et al. | ......... 385/130 |
| 5,541,247 | A | * 7/1996 | Koike | ......................... 524/285 |
| 5,573,889 | A | * 11/1996 | Hofmann et al. | ......... 430/285.1 |
| 6,081,632 | A | * 6/2000 | Yoshimura et al. | ............. 385/5 |
| 6,166,125 | A | * 12/2000 | Sugiyama et al. | .......... 524/462 |
| 6,185,353 | B1 | * 2/2001 | Yamashita et al. | .......... 385/124 |
| 2002/0114601 | A1 | 8/2002 | Kagami et al. | |

FOREIGN PATENT DOCUMENTS

| | | |
|---|---|---|
| EP | 0 566 744 A1 | 10/1993 |
| JP | 11-326660 | 11/1999 |
| JP | 2000-347043 | 12/2000 |
| JP | 2001-242353 | 9/2001 |
| JP | 2001-242354 | 9/2001 |
| JP | 2002-169038 | 6/2002 |
| JP | 2002-202427 | 7/2002 |

OTHER PUBLICATIONS

JPO machine translation of JP 2000–347043, Dec. 15, 2000.*
European Search Report dated Aug. 14, 2003.
David P. Jackson, "Centrifugal Shear Carbon Dioxide Cleaning", Precision Cleaning 1995, pp. 223–236, XP–002246472.

* cited by examiner

Primary Examiner—Susan Berman
(74) Attorney, Agent, or Firm—McGinn & Gibb, PLLC

(57) ABSTRACT

Into a mixture solution 2 of a high-refractive-index photo-curable resin A and a low-refractive-index photo-curable resin B, light capable of curing only the resin A is led through an optical fiber 1 so that a cured resin 211 of the resin A having a diameter substantially equal to the diameter of a core portion of the optical fiber is formed so as to extend from a tip of the optical fiber. Then, the residual mixture solution 2 is cured. In this manner, a module having the previously cured high-refractive-index resin 211 as an optical waveguide can be formed easily. On this occasion, the mixed state of the mixture solution 2 can be kept good enough to facilitate the formation of the high-refractive-index resin 211 when the solubility parameter $\delta_A$ of the high-refractive-index photo-curable resin A and the solubility parameter $\delta_B$ and volume fraction $\Phi_B$ of the low-refractive-index photo-curable resin B satisfy the following expression (4).

$$|\delta_A - \delta_B| < -7.5 \Phi_B + 6.0 \qquad (4)$$

16 Claims, 4 Drawing Sheets

SELF-FORMABLE OPTICAL WAVEGUIDE MATERIAL COMPOSITION

The present application is based on Japanese Patent Application No. 2001-377957, the entire contents of which are incorporated herein by reference.

BACKGROUND OF THE INVENTION

The present invention relates to a self-formable optical waveguide material composition containing two photo-curable resins which have different refractive indices and which can be cured by different wavelengths respectively. The concept "photo-curable resin" used in the invention means a monomer, a macro-monomer or an oligomer containing a photo-reaction initiator.

SUMMARY OF THE INVENTION

Some of the present inventors have already developed a technique disclosed in Japanese Unexamined Patent Publication No. JP 2000-347043A. The technique is as follows. Into a mixture solution containing a high-refractive-index photo-curable resin and a low-refractive-index photo-curable resin, light to cure only the high-refractive-index photo-curable resin is led through an optical fiber so that a high-refractive-index cured resin having a diameter substantially equal to the diameter of a core portion of the optical fiber is formed in the mixture solution so as extend from a tip of the optical fiber. Then, the residual mixture solution is cured, so that a module having the previously formed high-refractive-index resin as an optical waveguide can be formed easily.

This technique will be described with reference to FIGS. 1A through 1D. In the condition that a mixture solution 2 containing a high-refractive-index photo-curable resin A 210 and a low-refractive-index photo-curable resin B 200 is put in a vessel 3, a tip of an optical fiber 1 is immersed in the mixture solution (FIG. 1A). Assume now that the high-refractive-index photo-curable resin A can be cured by a wavelength $\lambda_A$ but the low-refractive-index photo-curable resin B cannot be cured by the wavelength $\lambda_A$ whereas both the high-refractive-index photo-curable resin A and the low-refractive-index photo-curable resin B can be cured by a wavelength $\lambda_B$. This assumption can be satisfied in the relation $\lambda_A > \lambda_B$ and in the case where the high-refractive-index photo-curable resin A and the low-refractive-index photo-curable resin B have different curing mechanisms, i.e. using radical polymerization and ion polymerization respectively.

When optical waveguide-forming light at the wavelength $\lambda_A$ is led into the optical fiber 1 in the aforementioned condition, only the high-refractive-index photo-curable resin A in the mixture solution 2 is cured at the tip of the optical fiber 1 to thereby grow a cylindrical cured resin 211 successively (FIG. 1B). This is because the curing of the low-refractive-index photo-curable resin B is not initiated by light at the wavelength $\lambda_A$ so that the low-refractive-index photo-curable resin B is not copolymerized with the high-refractive-index photo-curable resin A. After the growth of the cylindrical cured resin 211 with a required length is completed thus (FIG. 1C), both the high-refractive-index photo-curable resin A and the low-refractive-index photo-curable resin B in a mixed state are cured by light at the wavelength $\lambda_B$ given from the outside. As a result, there is obtained a cured resin 23 which is not a copolymer but has a refractive index between refractive indices of two cured resins which can be obtained when the high-refractive-index photo-curable resin A and the low-refractive-index photo-curable resin B are cured singly respectively. In this manner, the cylindrical cured resin 211 having a high refractive index and the cured resin 23 having a refractive index lower than that of the cylindrical cured resin 211 can form an optical waveguide (FIG. 1D).

While the inventors was further developing this technique, the inventors found that the mixed state of the high-refractive-index photo-curable resin A and the low-refractive-index photo-curable resin B before curing is very important. That is, in the optical waveguide constituted by the cylindrical cured resin 211 having a high refractive index and the cured resin 23 having a refractive index lower than that of the cylindrical cured resin 211, leakage loss can be reduced as the refractive index difference between the two cured resins 211 and 23 increases. This means the fact that the high-refractive-index photo-curable resin A and the low-refractive-index photo-curable resin B before curing are largely different from each other in terms of chemical structure. Hence, the mixed state is apt to become poor to cause a phenomenon that the mixture solution 2 turns white turbidly. When the mixture solution 2 turns white turbidly, optical waveguide-forming light in a photo-polymerization reactive portion is scattered to make the formation of the cylindrical cured resin 211 so insufficient that the cylindrical cured resin 211 can little grow occasionally. In addition, if the amount of the high-refractive-index photo-curable resin A is extremely smaller than the amount of the low-refractive-index photo-curable resin B, the cylindrical cured resin 211 still little grows.

In order to solve the problem, an object of the invention is to find an appropriate combination of a high-refractive-index photo-curable resin A and a low-refractive-index photo-curable resin B by estimating solubility parameters of the two photo-curable resins A and B before curing. Another object of the invention is to find an appropriate composition on the basis of the relation in solubility parameter and volume fraction between a high-refractive-index photo-curable resin A and a low-refractive-index photo-curable resin B before curing.

According to an aspect of the invention, there is provided a self-formable optical waveguide material composition containing a first photo-curable resin which can be cured by a certain wavelength, and a second photo-curable resin which is not cured by the certain wavelength but can be cured by another wavelength, wherein the self-formable optical waveguide material composition satisfies the expression (1):

$$|\delta_A - \delta_B| < 6.0 \tag{1}$$

in which $\delta_A$ is a solubility parameter of the first photo-curable resin expressed in $MPa^{1/2}$, and $\delta_B$ is a solubility parameter of the second photo-curable resin expressed in $MPa^{1/2}$.

Incidentally, the relation 2 MPa$^{1/2}$≈1 cal$^{1/2}$/cm$^{3/2}$ holds hereinafter.

According to another aspect of the invention, the self-formable optical waveguide material composition satisfies the expression (2) or (3):

$$|\delta_A-\delta_B|<5.0 \quad (2)$$

$$|\delta_A-\delta_B|<4.0 \quad (3)$$

According to a further aspect of the invention, the ratio of the refractive index of the first photo-curable resin before curing to the refractive index of the second photo-curable resin before curing is higher than 1 but not higher than 1.14, and the volume fraction of the second photo-curable resin is not lower than 0.01 but lower than 0.8. Incidentally, this hereinafter means the fact that the refractive index of the first photo-curable resin before curing is not higher than 1.14 times as high as the refractive index of the second photo-curable resin before curing. On the other hand, the volume fraction of the second photo-curable resin means the ratio of the volume of the second photo-curable resin to the sum of the volume of the first photo-curable resin and the volume of the second photo-curable resin before mixing. Especially preferably, the volume fraction is selected to be not lower than 0.1.

According to a further aspect of the invention, there is provided a self-formable optical waveguide material composition containing a first photo-curable resin which can be cured by a certain wavelength, and a second photo-curable resin which is not cured by the certain wavelength but can be cured by another wavelength, wherein: the ratio of the refractive index of the first photo-curable resin before curing to the refractive index of the second photo-curable resin before curing is higher than 1 but not higher than 1.14; and the self-formable optical waveguide material composition satisfies the expression (4):

$$|\delta_A-\delta_B|<-7.5\Phi_B+6.0 \quad (4)$$

in which $\delta_A$ is a solubility parameter of the first photo-curable resin expressed in MPa$^{1/2}$, $\delta_A$ is a solubility parameter of the second photo-curable resin expressed in MPa$^{1/2}$, and $\Phi_B$ ($\Phi_B \geq 0.01$) is a volume fraction of the second photo-curable resin. Especially preferably, the volume fraction $\Phi_B$ is selected to be not lower than 0.1.

According to a further aspect of the invention, the self-formable optical waveguide material composition satisfies the expression (5) or (6):

$$|\delta_A-\delta_B|<-7.5\Phi_B+5.0 \quad (5)$$

$$|\delta_A-\delta_B|<-7.5\Phi_B+4.0 \quad (6)$$

The inventors have found that the relation between the solubility parameter of the first photo-curable resin and the solubility parameter of the second photo-curable resin plays an important role in this subject of matter as will be described in the following embodiments. That is, it has been found that there is a large difference in optical waveguide-forming speed between the case where the restrictive item of each aspect of the invention is satisfied and the case where the restrictive item is not satisfied. This means the fact that it is important to provide a combination of the first photo-curable resin and the second photo-curable resin easily soluble in each other. That is, the condition that the two photo-curable resins are mixed well is essential for curing only the first photo-curable resin. The relation between the mixed state and the volume fraction, that is, the mixture ratio is more remarkable.

DETAILED DESCRIPTION OF THE PREFERRED EMBODIMENTS

Data indicating the effectiveness of the invention will be described below. Resins, etc used for obtaining the data are as follows. Hereinafter, names of articles in Table 1 are abbreviated as M1100, M210, M6200, OXT101, OXT221, OXT212 and 2021P in order. Incidentally, each of M1100, M210 and M6200 contains no polymerization initiator. Therefore, each of M1100, M210 and M6200 mixed with 1% of Irgacure 819 (bis(2,4,6-trimethylbenzoyl)-phenylphosphine oxide) made by Ciba Speciality Chemicals Inc. is used as a high-refractive-index photo-curable resin A. Incidentally, solubility parameters are calculated by the Small et al. calculation method described in Polymer Handbook 4th edition pp.682–685 published by Wiley Interscience and on the basis of data therefor (the same book, the same pages, table 1–3).

TABLE 1

In Table 1, $n_D$ means a refractive index on the basis of D-line of Na.

High-Refractive-Index Photo-Curable Resin A (each made by Toagosei Co., Ltd.)

| Product Name | $n_D$ | $\delta_A$ | Content |
|---|---|---|---|
| ARONIX M-1100 | 1.490 | 22.10 | Urethane denatured acrylate |
| ARONIX M-210 | 1.536 | 20.84 | Bisphenol A/ EO denatured diacrylate |
| ARONIX M-6200 | 1.519 | 22.70 | Polyester acrylate |

Low-Refractive-Index Photo-Curable Resin B (each made by Toagosei Co., Ltd.)

| Product Name | $n_D$ | $\delta_A$ | Content |
|---|---|---|---|
| OXT-101 | 1.453 | 23.72 | 3-ethyl-3-hydroxymethyloxetane |
| OXT-221 | 1.456 | 18.25 | Di[1-ethyl(3-oxetanyl)]methyl ether |
| OXT-212 | 1.442 | 17.10 | 3-ethyl-3-(2-ethylhexyloxymethyl)oxetane |

Low-Refractive-Index Photo-Curable Resin B (made by Daicel Chemical Industries, Ltd.)

| Product Name | $n_D$ | $\delta_A$ | Content |
|---|---|---|---|
| Celoxide 2021P | 1.497 | 23.44 | Alicyclic epoxy compound |

| Solvent | $n_D$ | $\delta_A$ |
|---|---|---|
| Metanol | 1.327 | 28.17 |
| Hexane | 1.372 | 14.90 |
| Heptane | 1.385 | 15.21 |

Figure 1:
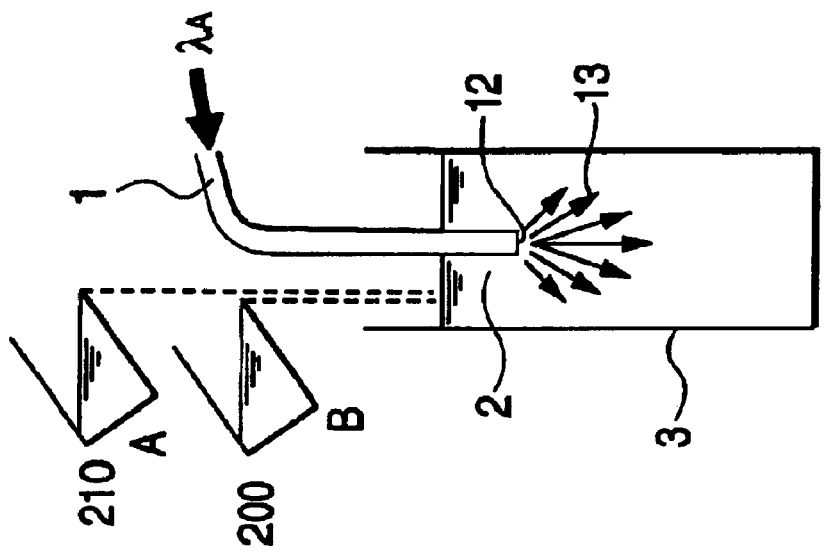
FIGS. 1A to 1D are process views showing an optical waveguide-forming method to which the invention is applied.
Figure 2:
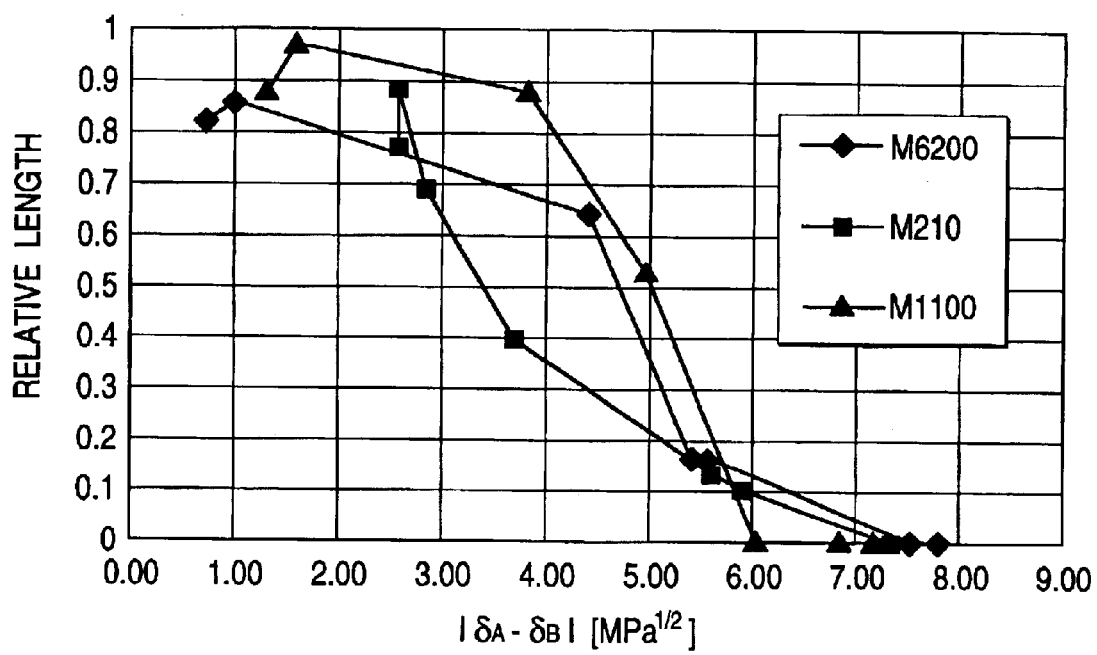
FIG. 2 is a graph showing the relation between the absolute value of solubility parameter difference and the relative length of the cured resin obtained by curing a high-refractive-index photo-curable resin.

In Table 1, curing of the high-refractive-index photo-curable resin A in the presence of the polymerization initiator therefor is radical polymerization. For this reason, the low-refractive-index photo-curable resin B mainly subjected to ring-opening polymerization by cationic polymerization is not copolymerized with the high-refractive-index photo-curable resin A. Thus, in 18 combinations of the high-refractive-index photo-curable resin A and the low-refractive-index photo-curable resin B or a solvent in Table 1, the curing speed of the high-refractive-index photo-curable resin A to form a core of an optical waveguide was observed in the condition that the volume fraction of the high-refractive-index photo-curable resin A was 0.8. That is, in a reaction system shown in FIGS. 1A to 1D, the length of the cured resin 211 obtained by irradiation with light for a predetermined time was measured. The solvent was not equivalent to the low-refractive-index photo-curable resin B but was used as a material substituted for the low-refractive-index photo-curable resin B for the sake of convenience in order to verify materials having various solubility parameters. An optical fiber 1 having a core diameter of 730 μm, a clad diameter of 750 μm and a numerical aperture of 0.25 was used. Monochromatic light at a wavelength of 488 nm was used as incident light. Results of the measurement were as shown in FIG. 2. In FIG. 2, the vertical axis was taken to express the relative length of the cured resin 211 whereas the horizontal axis was taken to express the absolute value of solubility parameter difference. The relative length was calculated as follows. In the condition that each of M1100, M210 and M6200 as the high-refractive-index photo-curable resin A was put singly in a vessel 3 shown in FIGS. 1A to 1D, the time required for the length of the cured resin 211 to reach 20 mm was measured as irradiation time in each mixture. In each composition to be tested, the length (mm) of the cured resin 211 formed for the irradiation time was measured and divided by 20. The resulting value was obtained as the relative length. When any one of M1100, M210 and M6200 was used as the high-refractive-index photo-curable resin A, the cured resin serving as a core of an optical waveguide was not formed at all it the absolute value of solubility parameter difference was larger than 6.0. When any one of M1100, M210 and M6200 was used as the high-refractive-index photo-curable resin A, the relative length of the cured resin serving as a core of an optical waveguide became noticeably large if the absolute value of the solubility parameter difference between the high-refractive-index photo-curable resin A and the low-refractive-index photo-curable resin B or solvent mixed therewith was not larger than 5.0. The relative length of the cured resin serving as a core of an optical waveguide became further larger if the absolute value of solubility parameter difference was not larger than 4.0.

Figure 3:
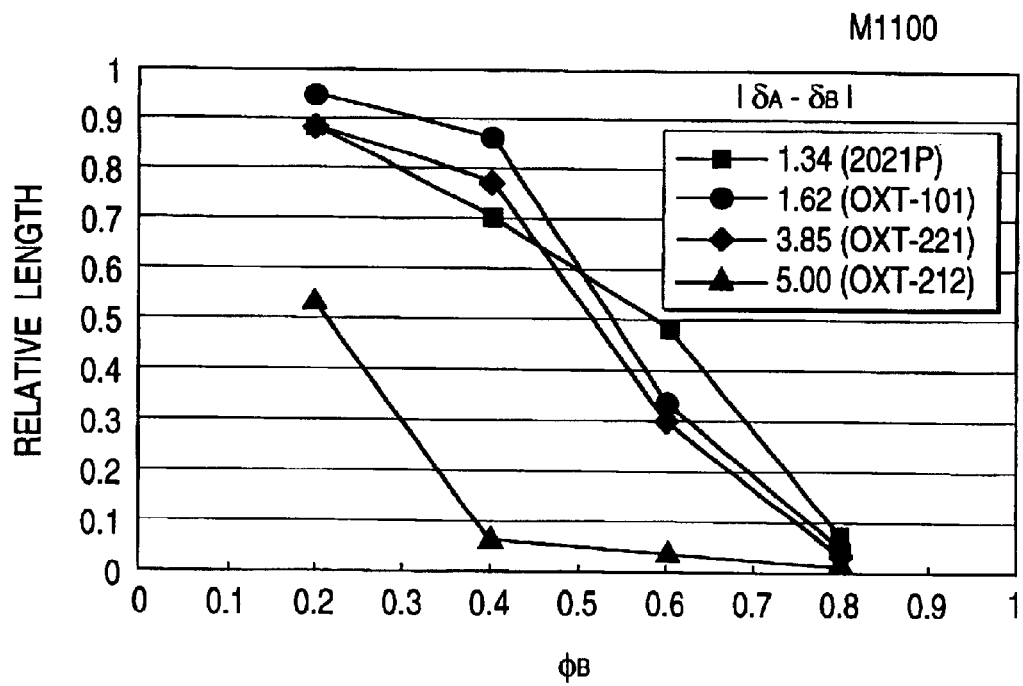
FIG. 3 is a graph showing the relation between the volume fraction of a low-refractive-index photo-curable resin and the relative length of the cured resin obtained by curing a high-refractive-index photo-curable resin M1100.
Figure 4:
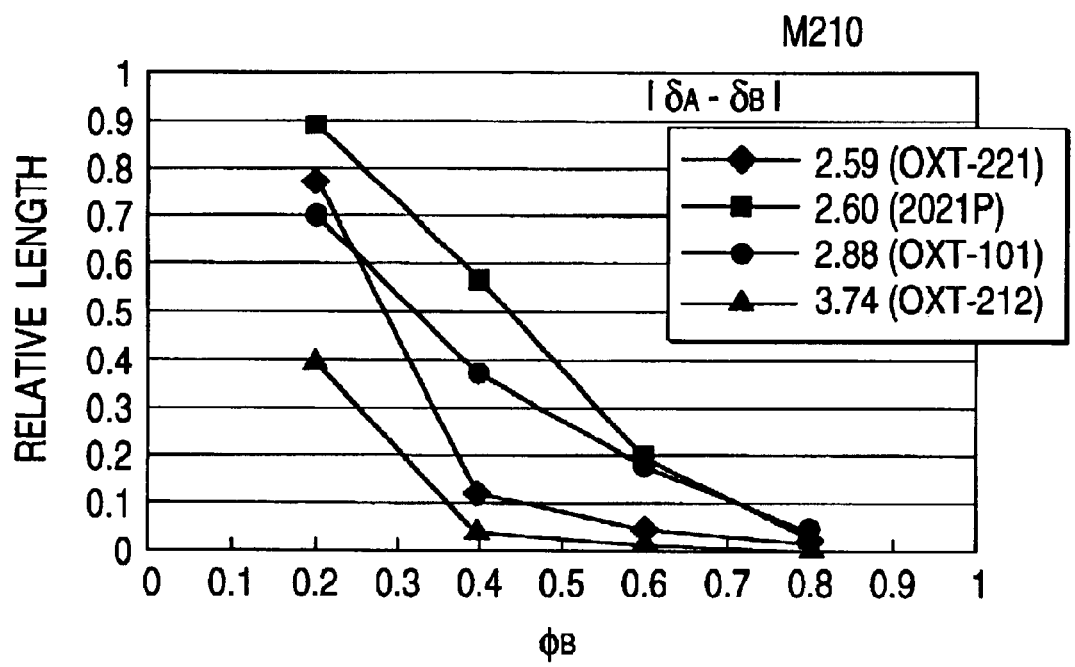
FIG. 4 is a graph showing the relation between the volume fraction of a low-refractive-index photo-curable resin and the relative length of the cured resin obtained by curing a high-refractive-index photo-curable resin M210.
Figure 5:
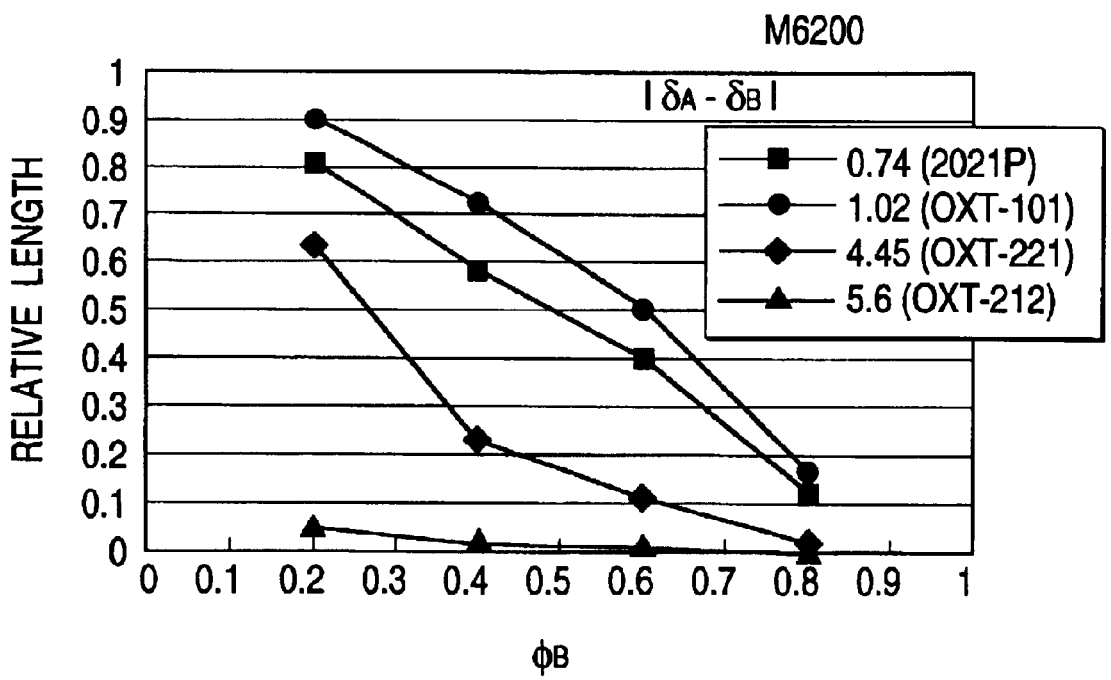
FIG. 5 is a graph showing the relation between the volume fraction of a low-refractive-index photo-curable resin and the relative length of the cured resin obtained by curing a high-refractive-index photo-curable resin M6200.

In each of FIGS. 3, 4 and 5, the vertical axis was taken to express the relative length of the cured resin 211 whereas the horizontal axis was taken to express the compounding ratio (volume fraction) of the low-refractive-index photo-curable resin B. The relative length was calculated as follows. Four low-refractive-index photo-curable resins B were one by one combined with a high-refractive-index photo-curable resin A to thereby form four combinations. While the compounding ratio (volume fraction) of each of the four combinations was changed, the length (mm) of the cured resin 211 was measured and divided by 20. The resulting value was obtained as the relative length of the cured resin 211. In any case, only a very short cured resin 211 was formed when the volume fraction $\Phi_B$ of the low-refractive-index photo-curable resin B was not lower than 0.8.

Figure 6:
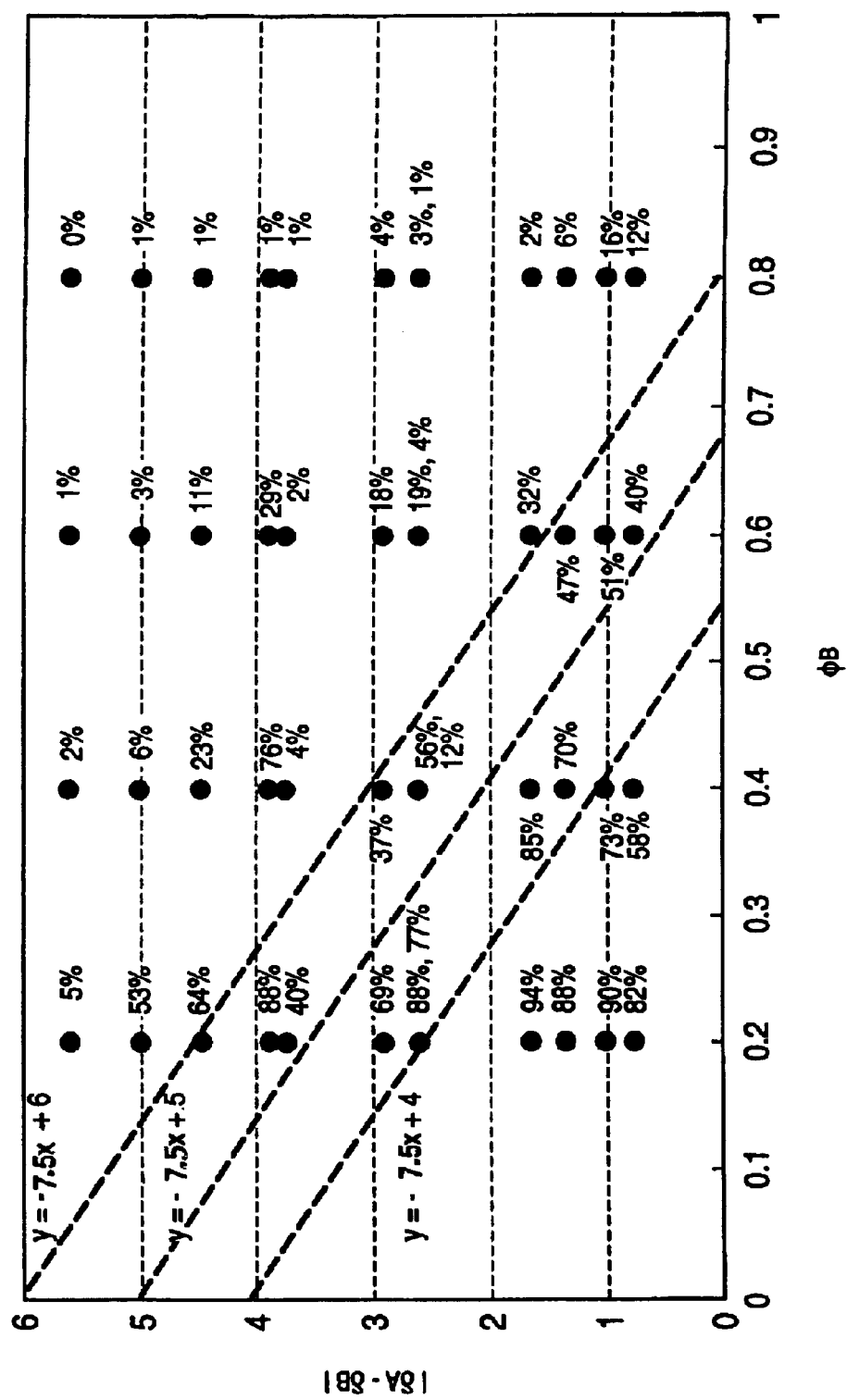
FIG. 6 is a graph showing the relation between the volume fraction $\Phi_B$ of a low-refractive-index photo-curable resin B and the absolute value of solubility parameter difference in the case where the relative length of the cured resin is taken as a point in the graph.

FIG. 6 shows data obtained in FIGS. 3, 4 and 5. In FIG. 6, the horizontal axis was taken to express the volume fraction $\Phi_B$ of the low-refractive-index photo-curable resin B whereas the vertical axis was taken to express the absolute value of solubility parameter difference. In FIG. 6, each point expresses the relative length of the cured resin 211. From the points, there was deduced the relation between the volume fraction $\Phi_B$ of the low-refractive-index photo-curable resin B and the absolute value of solubility parameter difference to make the relative length of the cured resin 211 not smaller than a predetermined value. The relation was as follows. A composition satisfying the expression (5) is preferable to a composition satisfying the expression (4). A composition satisfying the expression (6) is preferable to the composition satisfying the expression (5).

$$|\delta_A - \delta_B| < -7.5\Phi_B + 6.0 \tag{4}$$

$$|\delta_A - \delta_B| < -7.5\Phi_B + 5.0 \tag{5}$$

$$|\delta_A - \delta_B| < -7.5\Phi_B + 4.0 \tag{6}$$

The photo-polymerization initiator and the monomer or oligomer which can be preferably used in the method for producing an optical waveguide according to the invention are, for example, as follows.

As a monomer subjected to radical photo-polymerization, (meth)acrylic ester or (meth)acrylamide maybe preferably used. Specifically, there can be used monofunctional (meth) acrylic ester (mono(meth)acrylate) such as 2-ethylhexyl (meth)acrylate, cyclohexyl (meth)acrylate or 2-butoxyethyl (meth)acrylate. There can be also used ester of diol and bivalent (meth)acrylate (di(meth)acrylate) such as ethylene glycol, neopentyl glycol or 1,6-hexanediol. There can be further used ester of (meth)acrylic acid and an organic compound having a plurality of alcoholic hydroxyl groups (tri, tetra, . . . (meth)acrylate). Incidentally, methylhydrogen, methylene-hydrogen and methine-hydrogen in (meth)acryloyl groups and other organic skeletons in these monomers may be partially replaced by halogen. Further, these monomers may be used in combination suitably.

As an oligomer (macromonomer) subjected to radical photo-polymerization, there can be preferably used an urethane oligomer, a polyether oligomer, an epoxy oligomer, a polyester oligomer or the like, having a (meth)acryloyl group at a terminal or branch. Incidentally, methylhydrogen, methylene-hydrogen and methine-hydrogen in (meth)acryloyl groups and other organic skeletons in these oligomers may be partially replaced by halogen. Further, these oligomers combined with the aforementioned monomers suitably my be used.

As a radical photo-polymerization initiator, there can be used: a benzyldimethylketal compound such as 2,2-dimethoxy-2-phenylacetophenone; an α-hydroxyketone compound such as 2-hydroxy-2-methyl-phenylpropane-1-one or (1-hydroxycyclohexyl)-phenylketone; an α-aminoketone compound such as 2-benzyl-2-dimethylamino-1-(4-morpholinophenyl)-butane-1-one or 2-methyl-1-(4-(methylthio)phenyl)-2-morpholinopropane-1-one; a bisacylphosphine oxide compound such as bis(2,6-dimethoxybenzoyl)-2,4,4-trimethyl-bentylphosphine oxide or bis(2,4,6-trimethylbenzoyl)-phenylphosphine oxide; a metallocene compound such as bis(η-cyclopentadienyl)-bis(2,6-difluoro-3-(N-pyrrol)phenyl) titanium; and so on. Several kinds selected from these aforementioned radical photo-polymerization initiators may be used.

As a monomer or oligomer subjected to cationic photo-polymerization, there can be used: a compound having cyclic ether such as an epoxy ring or an oxetane ring; a cyclic lactone compound; a cyclic acetal compound; a vinyl ether compound; and so on. These monomers or oligomers may be used in combination suitably.

As a cationic photo-polymerization initiator, there can be used: 4,4'-bis(di(2-hydroxyethoxy)phenylsulfonio) phenylsulfide bihexafluoroantimonate; η-cyclopentadienyl-η-cumene iron(1+)-hexafluorophosphate(1–); and so on.

A photosensitizer may be added into the radical photo-polymerization initiator or the cationic photo-polymerization initiator. Additives such as a polymerization inhibitor, an ultraviolet absorber, a light stabilizer, an oxidation inhibitor, a leveling agent, and an anti-foaming agent may be further mixed as occasion demands. A photo-curable liquid resin composition used in the invention can be constituted by the aforementioned combination. Further, a combination of an anionic photo-polymerization initiator and a monomer or oligomer is not excluded from the invention. Polymerization due to thiol-ene addition may be also used. On the assumption that a core portion is formed by irradiation with light in the same manner as in the invention, a clad portion may be formed by another method than irradiation with light.

What is claimed is:

1. A self-formable optical waveguide material composition comprising:

a first photo-curable resin curable by light having a first wavelength; and a second photo-curable resin not curable by said light having a first wavelength and curable by light having a second wavelength, wherein said self-formable optical waveguide material composition satisfies the expression (1):

$$|\delta_A - \delta_B| < 6.0 \tag{1}$$

wherein $\delta_A$ is a solubility parameter of said first photo-curable resin expressed in $MPa^{1/2}$, and $\delta_B$ is a solubility parameter of said second photo-curable resin expressed in $MPa^{1/2}$, wherein the ratio of refractive index of said first photo-curable resin before curing to the refractive index of said second photo-curable resin before curing is greater than 1 and not greater than 1.14, and wherein the volume fraction of said second photo-curable resin is not less than 0.01 and less than 0.8.

2. The self-formable optical waveguide material composition according to claim 1, wherein said self-formable optical waveguide material composition satisfies the expression (2):

$$|\delta_A - \delta_B| < 5.0 \tag{2}$$

3. The self-formable optical waveguide material composition according to claim 1, wherein said self-formable optical waveguide material composition satisfies the expression (3):

$$|\delta_A - \delta_B| < 4.0 \tag{3}$$

4. The self-formable optical waveguide material according to claim 1, wherein said first photo-curable resin and said second photo-curable resin each comprises one of a monomer and an oligomer.

5. The self-formable optical waveguide material according to claim 1, wherein said first photo-curable resin is curable by radical photo-polymerization.

6. The self-formable optical waveguide material according to claim 1, wherein said second photo-curable resin is curable by cationic photo-polymerization.

7. A self-formable optical waveguide material composition comprising:

a first photo-curable resin curable by light having a first wavelength; and a second photo-curable resin not curable by said light having a first wavelength and curable by light having a second wavelength, wherein the ratio of the refractive index of said first photo-curable resin before curing to a refractive index of said second photo-curable resin before curing is greater than 1 and not greater than 1.14, and wherein said self-formable optical waveguide material composition satisfies the expression (4):

$$|\delta_A - \delta_B| < -7.5\Phi_B + 6.0 \qquad (4)$$

wherein $\delta_A$ is the solubility parameter of said first photo-curable resin expressed in $MPa^{1/2}$, $\delta_B$ is the solubility parameter of said second photo-curable resin expressed in $MPa^{1/2}$, and $\Phi_B$ is a volume fraction of said second photo-curable resin amendment.

8. The self-formable optical waveguide material composition according to claim 7, wherein said self-formable optical waveguide material composition satisfies the expression (5):

$$|\delta_A - \delta_B| < -7.5\Phi_B + 5.0 \qquad (5).$$

9. The self-formable optical waveguide material composition according to claim 7, wherein said self-formable optical waveguide material composition satisfies the expression (6):

$$|\delta_A - \delta_B| < -7.5\Phi_B + 4.0 \qquad (6).$$

10. The self-formable optical waveguide material composition according to claim 7, wherein the volume fraction of said second photo-curable resin in less than 0.01 and less than 0.8.

11. A method of manufacturing an optical waveguide device, said method comprising:

forming a mixture comprising a first photo-curable resin, curable by light having a first wavelength and a second photo-curable resin not curable by said light having a first wavelength and curable by light having a second wavelength;

forming a core portion of the optical waveguide device by curing said first photo-curable resin by irradiating said mixture with said light having a first wavelength; and forming a clad portion of the optical waveguide device by curing said first photo-curable resin and said second photo-curable resin by irradiating said mixture with said light having a second wavelength, wherein said first photo-curable resin and said second photo-curable resin satisfy the expression:

$$|\delta_A - \delta_B| < 6.0,$$

wherein $\delta_A$ represents the solubility parameter of said first photo-curable resin expressed in $MPa^{1/2}$ and $\delta_B$ represents the solubility parameter of said second photo-curable resin expressed in $MPa^{1/2}$.

12. The method of manufacturing an optical waveguide device according to claim 11, wherein said first photo-curable resin comprises:

a radical photo-polymerization initiator; and one of a free radically curable monomer and oligomer.

13. The method of manufacturing an optical waveguide device according to claim 11, wherein said second photo-curable resin comprises:

a cationic photo-polymerization initiator; and one of a cationically curable monomer and oligomer.

14. The method of manufacturing an optical waveguide device according to claim 11, wherein said forming said core portion comprises inserting a tip of an optical fiber into said mixture of said first photo-curable resin and said second photo-curable resin which emits said light having a first wavelength into said first photo-curable resin and said second photo-curable resin, wherein said first photo-curable resin is cured at the tip of the optical waveguide to grow said core portion.

15. The method of manufacturing an optical waveguide according to claim 11, wherein said forming said clad portion comprises emitting a light onto said mixture of said first photo-curable resin and said second photo-curable resin from the outside of said mixture, wherein said first photo-curable resin and said second photo-curable resin are cured to grow said clad portion.

16. The method of manufacturing an optical waveguide device according to claim 11, wherein the ratio of the refractive index of said first photo-curable resin before curing to a refractive index of said second photo-curable resin before curing is greater than 1 and not greater than 1.14, and wherein the volume fraction of said second photo-curable resin is not less than 0.01 and less than 0.8.

* * * * *